United States Patent [19]

Ruske

[11] 3,909,471

[45] Sept. 30, 1975

[54] SURFACE COATINGS OR PLASTICS COLORED WITH AN ANTHRAQUINONEOXADIAZOLE

[75] Inventor: Manfred Ruske, Ludwigshafen, Germany

[73] Assignee: BASF Aktiengesellschaft, Ludwigshafen (Rhine), Germany

[22] Filed: Nov. 21, 1973

[21] Appl. No.: 418,067

[30] Foreign Application Priority Data
Nov. 24, 1972 Germany............................ 2257672

[52] U.S. Cl................ 260/22 R; 106/168; 106/193; 260/37 P; 260/39 P; 260/40 R; 260/42.21; 260/307.5
[51] Int. Cl.².................... C07D 261/20; C08K 5/15
[58] Field of Search........... 260/42.21, 307.5, 37 P, 260/39 P, 40 R, 22 R

[56] References Cited
UNITED STATES PATENTS

| 2,511,018 | 6/1950 | Stilmar............................ 260/307.5 |
| 2,766,244 | 10/1956 | Brouillard........................ 260/307.5 |
| 3,022,299 | 2/1962 | Schmidt........................... 260/307.5 |
| 3,228,780 | 1/1966 | Grelat.................................. 260/41 |
| 3,316,114 | 4/1967 | Caliezi................................. 260/41 |

*Primary Examiner*—James H. Derrington
*Attorney, Agent, or Firm*—Johnston, Keil, Thompson & Shurtleff

[57] ABSTRACT

Surface coatings and organic plastics which contain an anthraquinoneoxadiazole of the formula:

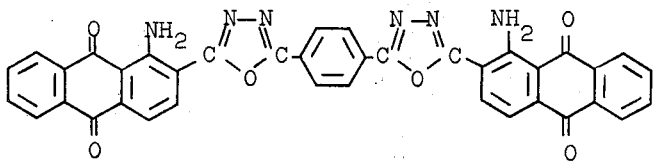

as a pigment. The colorations have excellent fastness properties.

6 Claims, No Drawings

SURFACE COATINGS OR PLASTICS COLORED WITH AN ANTHRAQUINONEOXADIAZOLE

The invention relates to colored surface coatings and plastics which contain an anthraquinoneoxadiazole of the formula:

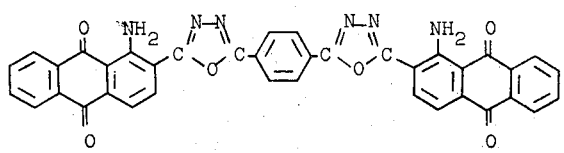

as a pigment.

The anthraquinoneoxadiazole of the formula (I) colors surface coatings and plastics bluish red to red hues. The colorations are distinguished by a high level of fastness properties.

Examples of plastics to be colored are high molecular weight organic thermoplastic materials such as polyvinyl chloride, flexible polyvinyl chloride, copolymers of vinyl chloride and for example vinyl acetate and other copolymers of vinyl chloride, polystyrene, copolymers of styrene with butadiene, acrylonitrile and/or acrylates, polyacrylates and copolymers of acrylonitrile, polyolefins such as polyethylene, polypropylene, polybutylene and polyisobutylene, polyamides and polycarbonates. Other plastics that may be colored include silicones and silicone resins, condensation resins such as amino resins, for example based on urea or melamine and formaldehyde, polyaddition resins such as epoxy or polyurethane resins, alkyd resins and also surface coatings which contain one or more than one of the said resins in an organic solvent or in the form of an aqueous organic emulsion.

The pigment to be used according to the invention is also suitable for the mass pigmentation of various polymers such as polyvinyl chloride, polyacrylonitrile, copolymers of acrylonitrile with other compounds or of polycondensates such as polyamides, of cellulose acetates such as secondary cellulose acetate and cellulose triacetate, and of regenerated cellulose.

The pigment of formula (I) may be prepared for example according to Example 1 of U.S. Pat. No. 2,511,018, according to Example 1 of French Patent 1,045,417 or Example 6 of German Patent 825,111.

The pigment as obtained is in a form which cannot be used for pigmentary purposes and is contaminated by byproducts which affect the purity of shade and the fastness properties of the colorations. The product therefore has to be purified and converted into a pigmentary form.

Purification by dissolving it in sulfuric acid and reprecipitating it has proved to be particularly advantageous. For this purpose the pigment is dissolved in oleum or in 98 to 100% by weight sulfuric acid and the solution obtained is diluted at a temperature below 25°C with dilute sulfuric acid or with water to a sulfuric acid concentration of 65 to 96% by weight, preferably 75 to 90% by weight. The pigment is thus precipitated in a finely crystalline form. The precipitate is filtered off and washed with cold sulfuric acid having about the concentration of the mother liquor. The pigment is obtained in this purification in a form which can be used for pigmentary purposes.

It is advantageous for use as a pigment however for the pigment obtained from sulfuric acid by fractional precipitation to be brought into a finely divided form. This may be effected for example by dissolving it in 98 to 100% by weight sulfuric acid or oleum at 15° to 20°C followed by precipitation by introduction into a large excess of ice and water, by grinding in the absence or presence of grinding aids such as salts and/or solvents, for example in a ball mill, or by reduction with sodium dithionite in dilute caustic soda solution at 40° to 75°C followed by oxidation in the alkaline solution.

The finely divided pigment obtained by fractionation, by swelling or by dissolving in and precipitating from sulfuric acid, by vatting or by grinding may also be aftertreated in aqueous, organic or aqueous-organic suspension at from ambient temperature to elevated temperature at atmospheric or superatmospheric pressure. Special forms of the pigment are thus obtained.

The pigment to be used according to the invention colors the substrate bluish red to red to reddish brown hues depending on the size and shape of the primary particles produced by the various treatments. In the former case the particle size is from 0.2 to 1.5 microns and in the second case it is more than 1.5 microns.

The moist filtered material may be converted into powdered form in a stream of hot air, at subatmospheric pressure and elevated temperature or by freeze drying at subatmospheric pressure.

The dry pigment thus obtained may be dispersed easily in plastics of the abovementioned type.

The pigment is chemically inert and therefore shaping the colored substrate for example by rolling, pressing, spinning, hardening or casting offers no problems; any chemical reactions of the substrate such as further polymerization, condensation or polyaddition are not interfered with.

The colorations obtained are distinguished in plastics by a very high level of fastness properties such as very good fastness to light and migration and by good thermostability.

The following examples illustrate the invention. Parts and percentages hereinafter specified are by weight.

EXAMPLE 1 a. 140 parts of dye which has been prepared according to Example 1 of U.S. Patent 2,511,018 is dissolved in 1040 parts of sulfuric acid monohydrate at 0° to 15°C. 354 parts of 75% sulfuric acid and 236 parts of water are dripped in at 0° to 15°C while mixing well. The fine crystals precipitated are filtered off and washed with 80% sulfuric acid until the effluent is colorless. The residue is suspended in 4000 parts of ice-water, suction filtered, washed until neutral and dried. 80% of the original weight is obtained in the form of a readily dispersible powder.

b. If cyclization into the oxadiazole is carried out in oleum (German Patent 825,111, Example 6) the pigment can be recovered direct from the reaction mixture in pure form from the oleum solution by dilution with a mixture of water and 75% sulfuric acid in the same manner as in (a).

c. 0.05 part of the pigment obtained according to (a) or (b) is incorporated into 50 parts of a mixture of 42 parts of polyvinyl chloride powder and 17 parts of di-(2-ethylhexyl) phthalate on heated mixing rolls at 140° to 145°C within 8 minutes. A reddish colored polyvinyl chloride rolled sheet is obtained from which film, sheeting or sections can be prepared. The colorations

EXAMPLE 2 a. 20 parts of the pigment purified according to Example 1 is stirred in powdered form into 250 parts of dimethylformamide and stirred for 5 hours at 145°C. The pigment is isolated in the usual manner. A finely particled pigment is obtained which after it has been incorporated into polyvinyl chloride produces a rolled sheet having a redder and more transparent coloration having otherwise the same level of fastness properties.

b. The same result is obtained when the aqueous pressed material of Example 1(a) or 1(b) is subjected to the treatment with dimethylformamide.

EXAMPLE 3

0.25 part of the pigment prepared according to Example 2(a) or 2(b), 2.5 parts of titanium dioxide (rutile), 50 parts of a mixture of 42 parts of polyvinyl chloride powder and 17 parts of di-(2-ethylhexyl) phthalate are passed through heatable mixing rolls at 140° to 145°C. A rolled sheet colored bluish red hues is obtained. The colorations are distinguished by high light and migration fastness.

EXAMPLE 4

0.2 part of the pigment and 1 part of titanium dioxide (rutile) are mixed dry with 100 parts of granular polystyrene block polymer in a drum mixer. The mixture is fused and homogenized in a screw extruder at a barrel temperature of 200° to 250°C. The material is granulated by face cutting at the die or by drawing out into threads while cooling. The granules thus obtained are then processed into shaped articles in an injection molding machine at 200° to 250°C or pressed into any desired articles. Injection moldings or pressings colored clear red hues are obtained; they have light fastness, resistance to bleeding and stability at high temperature.

Polyethylene is colored analogously; the colored polyethylene is fast to light and the pigment does not bleed.

EXAMPLE 5 a. 167 parts of aqueous pigment paste whose production is described under (d) and which contains 20 parts of pigment is processed into a full shade paste with 64 parts of a solvent-free alkyd resin which has been modified with soy bean oil and 16 parts of di-(2-ethylhexyl) phthalate by flushing on a three-roll mill at 60 atmospheres gauge (six passes).

b. 66 parts of binder (obtained by mixing 70 parts of solvent-free alkyd resin modified with soy bean oil), 17.5 parts of di-(2-ethylhexyl) phthalate and 12.5 parts of a solvent-free melamine resin are ground into a white paste with 30 parts of titanium dioxide (rutile type) and 4 parts of a colloidal silicon dioxide on a three roll mill at 60 atmospheres gauge (six passes).

c. 0.4 part of the full shade paste prepared according to (b) is homogenized and ground in a millstone mill. A surface coating is prepared with this paste and is baked for 45 minutes at 120°C. A bluish red coloration of high purity and excellent light fastness is obtained.

d. The aqueous paste used in (a) is prepared as follows: The pigment obtained according to Example 1(a) or 1(b) is vatted with sodium dithionite and caustic soda solution and the vatted pigment is oxidized by oxidation with sodium m-nitrobenzenesulfonate at 60° to 70°C. The precipitate is filtered off and washed with water until neutral.

The same result is achieved when the oxidation is carried out with air at from 60° to 70°C.

EXAMPLE 6

5 parts of pigment (prepared from the pigment paste described in Example 5(d) by freeze drying) and 95 parts of a baking finish containing 70% of coconut alkyd resin (60% in xylene) and 30% of melamine resin (55% in butanol and xylene) are ground in an attrition mill.

After the product has been applied and baked for 30 minutes at 120°C a red surface coating is obtained which has very good overcoating fastness and high light fastness. When titanium dioxide (rutile type) is added to the baking finish for reduction very pure bluish red colorations are obtained.

EXAMPLE 7

A pigment formulation consisting of 0.5 part of pigment (prepared according to Example 5(d)) and 0.5 part of a 25% aqueous solution of the reaction product of 1 mole of isononylphenol with 12 moles of ethylene oxide and a mixture of 17.5 parts of titanium dioxide (rutile type), 17.5 parts of finely ground dolomite, 17.5 parts of air-sifted heavy spar and 12.5 parts of a wetting liquid (consisting of 10 parts of water, 0.25 part of 25% ammonia solution, 0.125 part of a polyacrylate and 0.125 part of sodium polyphosphate) and 35 parts of a 50% aqueous polymer dispersion based on vinyl propionate is dispersed with a high speed mill to form an emulsion paint having a reddish hue. Coatings obtained therewith have good light fastness properties.

EXAMPLE 8

100 parts of a pigment formulation consisting of a 50% aqueous pigment paste (prepared according to Example 5(d)) with an adduct of 15 moles of ethylene oxide to 1 mole of ditertiary-butyl-p-cresol as wetting agent, 900 parts of an oil-in-water emulsion (containing 69% of kerosene, 5% of binder as a 40% aqueous dispersion of a copolymer based on an acrylic ester, 6% of 5% alginate thickening, 3% of a potential acid donor such as ammonium nitrate, 1% of a reaction product of 1 mole of isononylphenol with 12 moles of ethylene oxide and 16% of water) are mixed to form a total of 1000 parts of a homogeneous flexible paste.

This paste may be printed by a conventional method onto cloth of synthetic fibers or regenerated cellulose cloth by means of rollers or screens. After the prints have been dried at ambient or elevated temperature and subjected to a heat treatment at 120°C to 150°C for a period of a few minutes bluish red prints are obtained having good purity of shade and excellent fastness to light, crocking, drycleaning and laundering.

EXAMPLE 9

100 parts of uncolored polyamide granules is colored with 0.1 part of pigment in an extruder at 275° to 280°C. The colored polyamide material may be melt spun at 280°C to give filaments having a reddish hue. The pigment does not undergo any change under these conditions.

EXAMPLE 10

100 parts of polycarbonate having a K value (according to Fikentscher) of 48 to 58 (measured in 0.5% solution in methylene chloride) is colored with 0.1 part of the pigment obtained according to Example 2(a) or 2(b)) in an extruder at a temperature of from 270° to 280°C. The material is granulated at the die. The red granules obtained can be shaped on a press into any desired articles. Shaped articles thus obtained have high light fastness and thermostability.

I claim:

1. A colored surface coating material or mass pigmented plastic material comprising the anthraquinoneoxadiazole of the formula

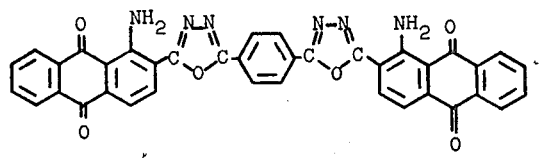

in finely divided pigment form dispersed in said coating or plastic material which is a polymer selected from the group consisting of polyvinyl chloride, vinyl chloride copolymers, polystyrene, styrene copolymers, polyacrylates, acrylonitrile copolymers, polyolefins, polyamides, polycarbonates, silicone resins, amino resins based on urea or melamine and formaldehyde, epoxy resins, polyurethane resins and alkyd resins.

2. A colored or mass pigmented material as claimed in claim 1 in which the polymer is polyvinyl chloride or a copolymer of vinyl chloride with vinyl acetate.

3. A colored or mass pigmented material as claimed in claim 1 in which the polymer is polystyrene or a copolymer of styrene with butadiene, acrylonitrile, an acrylate or mixtures thereof.

4. A colored or mass pigmented material as claimed in claim 1 in which the polymer is polyethylene, polypropylene, polybutylene or polyisobutylene.

5. A colored or mass pigmented material as claimed in claim 1 in which the polymer is a flexible polyvinyl chloride.

6. A colored or mass pigmented material as claimed in claim 1 in which the polymer is an amino resin based on urea or melamine and formaldehyde, an epoxy resin, a polyurethane resin or an alkyd resin.

* * * * *